United States Patent
Sakaguchi

(10) Patent No.: US 11,203,076 B2
(45) Date of Patent: Dec. 21, 2021

(54) WIRE CUT ELECTRIC DISCHARGE MACHINING APPARATUS

(71) Applicant: Sodick Co., Ltd., Kanagawa (JP)

(72) Inventor: Masashi Sakaguchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 597 days.

(21) Appl. No.: 16/182,627

(22) Filed: Nov. 7, 2018

(65) Prior Publication Data

US 2019/0184478 A1 Jun. 20, 2019

(30) Foreign Application Priority Data

Dec. 15, 2017 (JP) .............................. JP2017-240380

(51) Int. Cl.
*B23H 7/10* (2006.01)

(52) U.S. Cl.
CPC ............. *B23H 7/101* (2013.01); *B23H 7/105* (2013.01)

(58) Field of Classification Search
CPC ........... B23H 7/105; B23H 7/101; B23H 1/10
USPC ...................................................... 219/69.14
See application file for complete search history.

(56) References Cited

U.S. PATENT DOCUMENTS

| | | | | |
|---|---|---|---|---|
| 6,150,626 | A * | 11/2000 | Moro ..................... | B23H 7/105 219/69.12 |
| 9,882,339 | B2 | 1/2018 | Takazane | |
| 2005/0265854 | A1 | 12/2005 | Arakawa et al. | |
| 2015/0108093 | A1* | 4/2015 | Yamane ................. | B23H 7/101 219/69.12 |

FOREIGN PATENT DOCUMENTS

| | | |
|---|---|---|
| JP | S62264818 | 11/1987 |
| JP | H01183323 | 7/1989 |
| JP | H11254239 | 9/1999 |
| JP | 2005335027 | 12/2005 |
| JP | 2016221654 | 12/2016 |
| JP | 2017143107 | 8/2017 |

OTHER PUBLICATIONS

Office Action of China Counterpart Application, with English translation thereof, dated Feb. 21, 2020, pp. 1-10.
"Office Action of Japan Counterpart Application," with English translation thereof, dated Dec. 24, 2019, p.1-p. 8.

* cited by examiner

*Primary Examiner* — Dana Ross
*Assistant Examiner* — Joe E Mills, Jr.
(74) *Attorney, Agent, or Firm* — JCIPRNET

(57) ABSTRACT

A wire cut electric discharge machining apparatus cannot maintain high machining accuracy because the arm may expand/contract as it receives more heat from the machining fluid. The wire cut electric discharge machining apparatus has guide parts that guide a wire and arms that support the guide parts, wherein at least one of the guide parts has a machining fluid ejection nozzle, and at least one of the arms has an ejection connection pipe and a thermal insulation part. The ejection connection pipe is a hole penetrating the arm and supplies the machining fluid to the machining fluid ejection nozzle, and the thermal insulation part covers the inner peripheral surface of the ejection connection pipe to thermally insulate the inner hole of the ejection connection pipe.

6 Claims, 3 Drawing Sheets

WIRE CUT ELECTRIC DISCHARGE MACHINING APPARATUS

CROSS-REFERENCE TO RELATED APPLICATION

This application claims the priority benefit of Japan application serial no. 2017-240380, filed on Dec. 15, 2017. The entirety of the above-mentioned patent application is hereby incorporated by reference herein and made a part of this specification.

BACKGROUND

Technical Field

The disclosure relates to a wire cut electric discharge machining apparatus for performing electric discharge machining by using a wire electrode, and more particularly relates to a wire cut electric discharge machining apparatus that includes a support part supporting a guide part for guiding the wire electrode.

Description of Related Art

Conventionally, a wire cut electric discharge machining apparatus has been adopted for performing electric discharge machining on a workpiece with use of a wire electrode. In general, the wire electrode for machining the workpiece is positioned and guided by an upper guide part and a lower guide part, which are arranged vertically opposite to each other, and the traveling wire electrode is stretched with a predetermined tension between the upper and lower guide parts.

The portions supporting the upper and lower guide parts are preferably made of a highly rigid material that is less likely to deform due to changes in the external environment such as temperature. Patent Document 1 (Japanese Laid-Open No. S62-264818) discloses a wire cut electric discharge machining apparatus, in which ceramics, a highly rigid material with less thermal deformation, is applied to the upper arm that supports the upper guide part or the lower arm that supports the lower guide part. Furthermore, preferably the lower arm is thermally insulating on the outer periphery. Patent Document 2 (Japanese Laid-Open No. H01-183323) discloses a wire cut electric discharge machining apparatus, in which the outer peripheral surface of the lower arm is covered with thermal insulation coating, and Patent Document 3 (Japanese Laid-Open No. H11-254239) discloses a wire cut electric discharge machining machine provided with a space part that forms a thermal insulation layer on the outer peripheral portion of the lower arm.

For example, the lower arm is immersed in machining fluid in a machining tank. The machining tank is supplied with the machining fluid that is supplied from a sub-tank by a feed pump. The sub-tank has a temperature adjustment device such as a cooling device that adjusts the temperature of the machining fluid, and manages the machining fluid to be at a predetermined temperature. While a predetermined amount of machining fluid is constantly supplied from the sub-tank by the feed pump, a predetermined amount of machining fluid is constantly discharged to the sub-tank from a drain pipe of the machining tank, so as to maintain the machining fluid in the machining tank at the predetermined temperature. The temperature around the lower arm is the temperature of the machining fluid in the machining tank. The lower guide part has a lower machining fluid ejection nozzle. The lower machining fluid ejection nozzle is for ejecting the machining fluid supplied from the sub-tank by an ejection pump to a predetermined portion in the machining tank. The lower machining fluid ejection nozzle ejects the machining fluid when required and does not eject the machining fluid when not required. The flow rate of the machining fluid ejected from the lower machining fluid ejection nozzle can be changed by the ejection pump if required. For example, the flow rate during rough machining is greater than the flow rate during finish machining. The ejection pump supplies the machining fluid to the lower machining fluid ejection nozzle through a lower ejection connection pipe which penetrates the center of the lower arm. The flow rate of the ejection pump can be greater than the flow rate of the feed pump.

The lower ejection connection pipe is at least a part of the flow path that connects the lower machining fluid ejection nozzle and the ejection pump. The temperature of the machining fluid flowing through the lower ejection connection pipe may be higher than that of the machining fluid around the lower arm because of the heat generated by the ejection pump or because the machining fluid is discharged from the ejection pump at high pressure. If the flow rate of the ejection pump is greater than the flow rate of the feed pump, the temperature of the machining fluid flowing through the lower ejection connection pipe may be higher than that of the machining fluid around the lower arm. The flow rate of the machining fluid flowing through the lower ejection connection pipe changes as required according to the flow rate of the machining fluid ejected from the lower machining fluid ejection nozzle. For example, the flow rate of the machining fluid flowing through the lower ejection connection pipe during rough machining is greater than that during finish machining. The temperature of the machining fluid flowing through the lower ejection connection pipe during rough machining is higher than that during finish machining. The machining fluid in the lower ejection connection pipe flows when the machining fluid is ejected from the lower machining fluid ejection nozzle and does not flow when it is not ejected.

SUMMARY

The lower arm that has the lower ejection connection pipe may expand/contract as it receives more heat from the machining fluid inside than the surrounding machining fluid. For example, the lower arm expands toward the front side where the lower guide part is provided when the temperature of the machining fluid flowing through the lower ejection connection pipe becomes higher than the surrounding temperature. For example, the lower arm starts to expand when the ejection of the machining fluid from the lower machining fluid ejection nozzle starts, and continues to expand even after the temperature of the machining fluid flowing through the lower ejection connection pipe becomes steady, and it may take several minutes for the expansion to stop. The expansion/contraction resulting from temperature change of the lower arm may cause the machining position of the wire electrode to deviate, which may hinder maintenance of high machining accuracy during wire cut electric discharge machining. In addition, if the lower arm expands/contracts to a large extent due to temperature change, it will require a long time for the expansion/contraction to stop and for the expanded/contracted length to become steady. Generally, it is desirable to start electric discharge machining immediately after ejection of the machining fluid from the lower machining fluid ejection nozzle starts. For example, the above situation also happens to the upper arm that has an upper ejection connection pipe. Besides, for example, when the wire electrode for machining the workpiece is positioned and guided by two horizontal guides that are arranged opposite to each other in the left-right direction, the above situation also happens to the horizontal arms that support the horizontal guides.

In view of the above, the disclosure provides a wire cut electric discharge machining apparatus that can reduce the amount of expansion/contraction of the arm resulting from the heat of the machining fluid flowing through the arm that supports the guide part to maintain high machining accuracy.

A wire cut electric discharge machining apparatus (1) of the disclosure includes guide parts that guide a wire (EL) and arms that support the guide parts, wherein at least one of the guide parts has a machining fluid ejection nozzle that ejects a machining fluid, and at least one of the arms has an ejection connection pipe and a thermal insulation part (95a), wherein the ejection connection pipe is a hole penetrating the arm and is at least a part of a flow path that supplies the machining fluid to the machining fluid ejection nozzle, and the thermal insulation part has a smaller thermal conductivity than the arm and covers an inner peripheral surface of the ejection connection pipe to thermally insulate an inner hole of the ejection connection pipe.

In addition, the at least one of the guide parts may be a lower guide part (81) that guides the wire under a workpiece, the at least one of the arms may be a lower arm (71) that supports the lower guide part, the machining fluid ejection nozzle may be a lower machining fluid ejection nozzle (81a) that ejects the machining fluid in the lower guide part, the ejection connection pipe may be a lower ejection connection pipe (95) that is a hole penetrating the lower arm and is at least a part of a flow path that supplies the machining fluid to the lower machining fluid ejection nozzle, and the thermal insulation part (95a) may have a smaller thermal conductivity than the lower arm and cover an inner peripheral surface of the lower ejection connection pipe to thermally insulate an inner hole of the lower ejection connection pipe.

In addition, the at least one of the arms may be formed of ceramics.

In addition, the thermal insulation part may be formed by heating and applying a tube that has heat expandability, and the machining fluid flows through the tube.

In addition, the tube may be formed of fluororesin that has heat expandability.

The wire cut electric discharge machining apparatus of the disclosure can maintain high machining accuracy.

DESCRIPTION OF THE EMBODIMENTS

Figure 1:
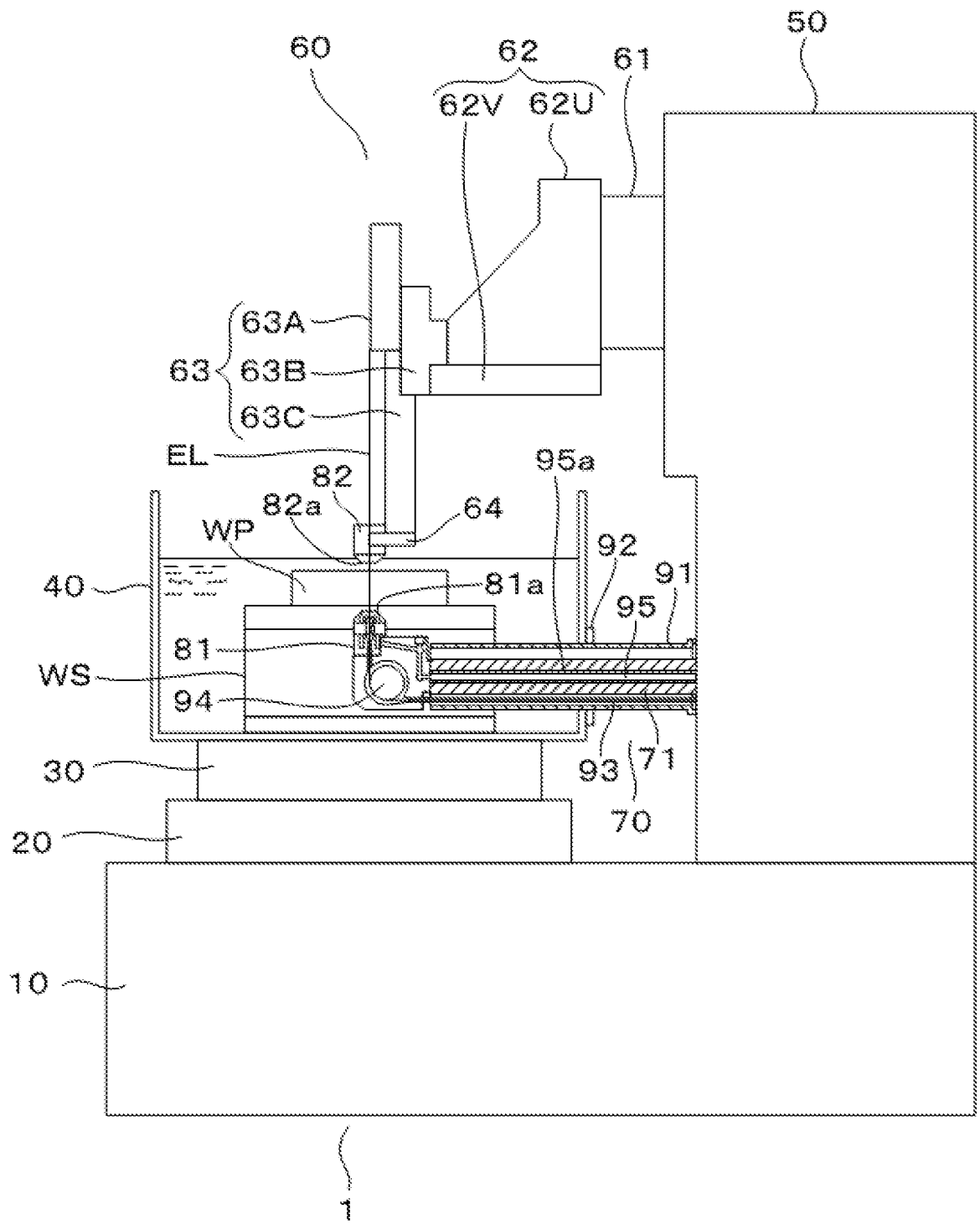
FIG. 1 is a general view showing an overview of the wire cut electric discharge machining apparatus according to an embodiment of the disclosure.
Figure 2:
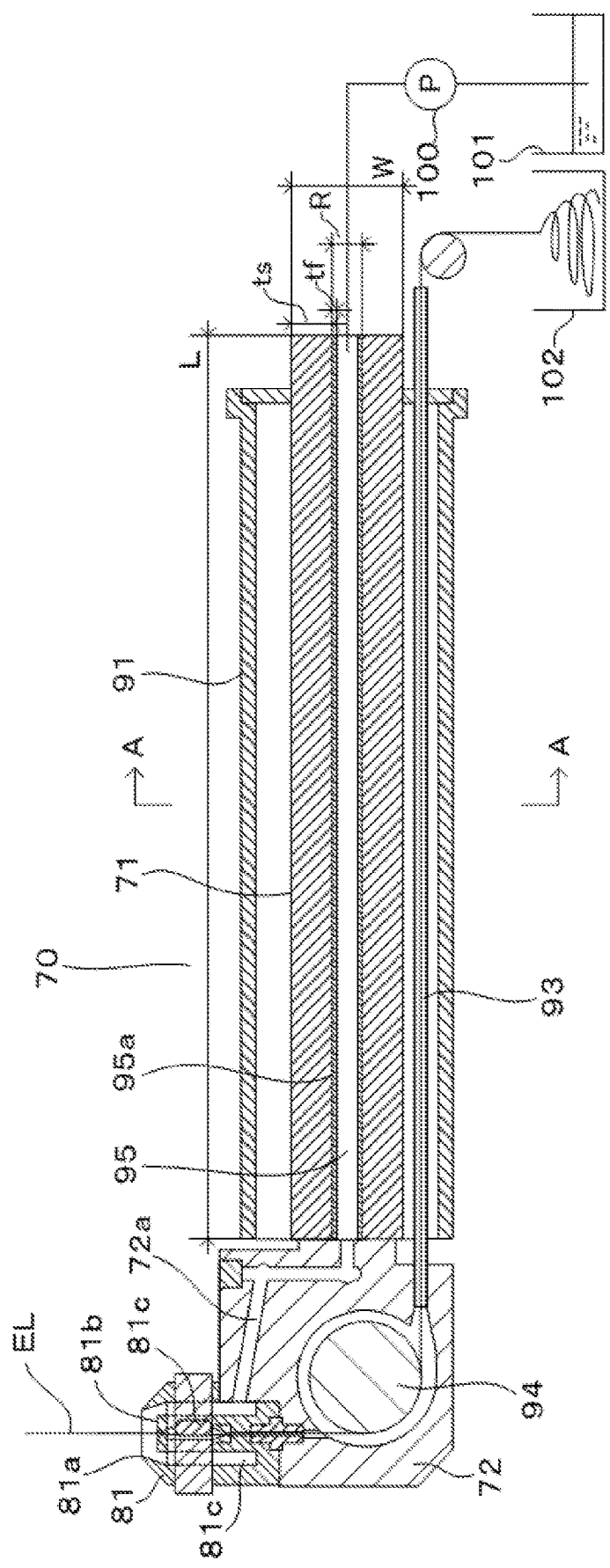
FIG. 2 is an enlarged cross-sectional view of main parts of the wire cut electric discharge machining apparatus of FIG. 1.
Figure 3:
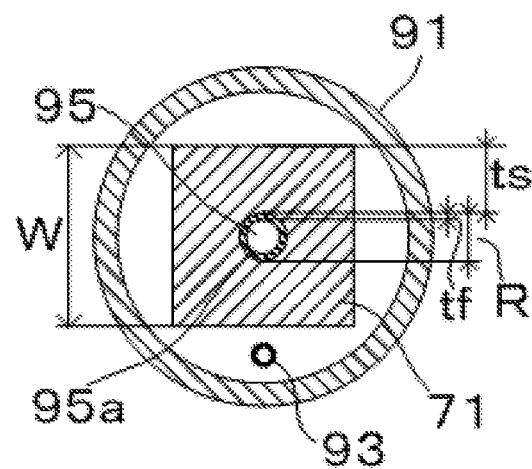
FIG. 3 is a cross-sectional view taken along the line A-A of FIG. 2.
Figure 4:
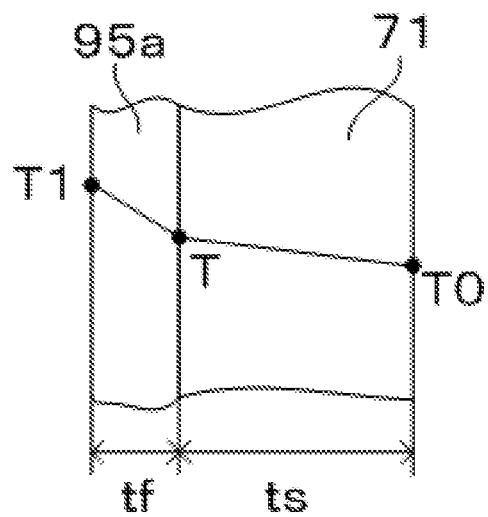
FIG. 4 is an enlarged schematic view of main parts showing a temperature distribution at the boundary portion between the thermal insulation part and the lower arm.

Hereinafter, embodiments of the disclosure will be described in detail with reference to the drawings. FIG. 1 shows a wire cut electric discharge machining apparatus 1 according to an embodiment of the disclosure. FIG. 1 is a cross-sectional view showing a part of the wire cut electric discharge machining apparatus 1, and is a cross-sectional view showing a part of a machining tank 40, a part of a lower support part 70 including a lower al iii 71, a part of an upper support part 60 including an upper arm 63, etc., for example. FIG. 2 is an enlarged view showing main parts of the lower arm 71 according to an embodiment of the disclosure, and FIG. 3 is a cross-sectional view taken along the line A-A of FIG. 2. FIG. 4 is an enlarged schematic view of main parts showing a temperature distribution at a boundary portion between a thermal insulation part and the lower arm. Regarding the temperatures shown in FIG. 4, T1>T>T0. Here, the X axis direction is a horizontal direction and is a direction perpendicular to the Y axis direction. The Y axis direction is a horizontal direction and is a direction perpendicular to the X axis direction. The Z axis direction is a direction perpendicular to the X axis direction and perpendicular to the Y axis direction. The U axis is in a direction parallel to the X axis direction. The V axis is in a direction parallel to the Y axis direction. The X axis direction and the U axis direction are the left-right direction. The Y axis direction and the V axis direction are the front-rear direction. The Z axis direction is the top-bottom direction.

The wire cut electric discharge machining apparatus 1 includes a bed 10, a column 50, a saddle 20, a table 30, the machining tank 40, a workstand WS, a power supply device (not shown) for electric discharge machining, and a control device (not shown). The bed 10 is placed on an installation surface. The column 50 stands vertically at the rear part of the bed 10. The saddle 20 is provided on the bed 10 to be movable in the Y axis direction. The table 30 is provided on the saddle 20 to be movable in the X axis direction. The machining tank 40 is provided on the table 30. The workstand WS is provided in the machining tank 40 on the table 30. A workpiece WP is placed on the workstand WS.

The column 50 has the upper support part 60, the lower support part 70, and a cylindrical slide pipe 91. The upper support part 60 supports an upper guide part 82 that extends from the column 50 in the horizontal direction to guide the wire electrode EL on the upper side. The lower support part 70 supports a lower guide part 81 that extends from the column 50 in the horizontal direction to guide the wire electrode EL on the lower side. The slide pipe 91 extends from the column 50 in the horizontal direction and is inserted into the machining tank 40 horizontally through a through hole formed in the tank wall of the machining tank 40. The upper support part 60 and the lower support part 70 are included in the support part.

The power supply device for electric discharge machining supplies a machining voltage between the workpiece WP and the wire electrode EL. The wire electrode EL is in contact with a lower power feeding member 81d and an upper power feeding member (not shown) to be connected to the power supply device for electric discharge machining. By displacing the table 30 in the X axis direction and displacing the saddle 20 in the Y axis direction, the control device moves the workpiece WP, which moves together with the table 30, relatively along a desired path with respect to the wire electrode EL supported by the upper guide part 82 and the lower guide part 81. The upper guide part 82 and the lower guide part 81 are included in the guide part.

The machining tank 40 is filled with a machining fluid. In the machining tank 40, the machining fluid of a sub-tank 101 is supplied by a feed pump (not shown). The sub-tank 101 has a temperature adjustment device (not shown) such as a cooling device for adjusting the temperature of the machining fluid and manages the machining fluid to be at a predetermined temperature. While a predetermined amount of machining fluid is constantly supplied from the sub-tank 101 by the feed pump, a predetermined amount of machining fluid is constantly discharged from a drain pipe (not shown) of the machining tank 40 to the sub-tank 101, so as to maintain the machining fluid in the machining tank 40 at the predetermined temperature. In the electric discharge machining apparatus 1, the temperature of the machining fluid is controlled according to the temperature of the apparatus main body, which includes the bed 10, the saddle 20, the table 30, and the column 50, so that the temperature of the machining fluid in the machining tank 40 matches the temperature of the apparatus main body.

The upper support part 60 includes a head 61, a UV table 62, the upper arm 63, and an upper connection member 64 in this order from the column side. The head 61 is provided movably in the Z axis direction. The UV table 62 has a U axis movement unit 62U and a V axis movement unit 62V. The U axis movement unit 62U is provided movably in the U axis direction. The V axis movement unit 62V is provided movably in the V axis direction. The UV table 62 is attached to the head 61 and relatively displaces the upper guide part 82 in the horizontal direction with respect to the lower guide part 81 when obliquely supporting the wire electrode EL to perform taper machining. The upper arms 63A, 63B, and 63C are attached to the UV table 62 to extend vertically downward. The upper connection member 64 is attached to the upper arm 63C to support the upper guide part 82. The upper arm 63 is included in the arm.

The lower support part 70 includes the slide pipe 91, the lower arm 71, a lower ejection connection pipe 95, a wire guide pipe 93, and an L-shaped lower connection member 72 in this order from the column side. The lower arm 71 and the wire guide pipe 93 are disposed through the slide pipe 91. The slide pipe 91 is provided with a slide plate 92. The slide plate 92 covers the opening portion of the through hole from the outer edge of the slide pipe 91. The slide plate 92 moves together with the slide pipe 91 with respect to the machining tank 40 in the X axis direction to prevent the machining fluid from leaking from the through hole of the machining tank 40. The size of the through hole of the machining tank 40 is set according to a relative movement range of the lower arm 71 with respect to the machining tank 40. The slide pipe 91, the lower arm 71, and the wire guide pipe 93 have gaps therebetween. When the machining tank 40 is filled with the machining fluid, the inside of the slide pipe 91 is filled with the machining fluid and the outer periphery of the lower arm 71 and the outer periphery of the wire guide pipe 93 are immersed in the machining fluid in the machining tank 40. The lower arm 71 is included in the arm.

The lower arm 71 is fixed to the side wall on the lower side of the column 50 and extends from the column 50, and is made of ceramics, metal, etc., for example. The lower ejection connection pipe 95 is a hole that penetrates the center of the lower arm 71. The wire guide pipe 93 guides the wire electrode EL toward the column 50.

The lower connection member 72 is attached to the lower arm 71 and supports the lower guide part 81 at a position facing the upper guide part 82. In the lower connection member 72, a communication passage 72a connected to the lower ejection connection pipe 95 is formed. The lower connection member 72 connects the lower guide part 81 to the lower arm 71 and supports a pulley 94 for guiding the wire electrode EL guided by the lower guide part 81 to the wire guide pipe 93. The wire electrode EL after electric discharge machining passes through the wire guide pipe 93 through the pulley 94 from the lower guide part 81 and is collected in a wire collection box 102 on the side of the column 50.

The lower guide part 81 includes a lower machining fluid ejection nozzle 81a, a lower guide 81b, a lower chamber 81c, and a lower power feeding member 81d. The lower guide 81b guides the wire electrode EL. The lower power feeding member 81d is in contact with the wire electrode EL to connect the power supply device for electric discharge machining to the wire electrode EL. The lower chamber 81c connects the communication passage 72a of the lower connection member 72 and the lower machining fluid ejection nozzle 81a. The lower machining fluid ejection nozzle 81a is provided near the lower guide 81b of the wire electrode EL and ejects the machining fluid supplied to the lower chamber 81b in a direction coaxial with the wire electrode EL (from the bottom to the top). An ejection pump 100 sends out the machining fluid in the sub-tank 101. The machining fluid sent out by the ejection pump 100 passes through the lower ejection connection pipe 95, the communication passage 72a of the lower connection member 72, and the lower chamber 81c in this order and is ejected from the lower machining fluid ejection nozzle 81a. The lower machining fluid ejection nozzle 81a is included in the machining fluid ejection nozzle.

A specific configuration of the disclosure will be described hereinafter. The lower ejection connection pipe 95 of the lower arm 71 is a hole penetrating the lower arm 71 and is at least a part of a flow path for supplying the machining fluid sent out by the ejection pump 100 to the lower machining fluid ejection nozzle 81a. The inner peripheral surface of the lower ejection connection pipe 95 is covered with a thermal insulation part 95a that has a smaller thermal conductivity than the lower arm 71. The machining fluid flows through the space surrounded by the thermal insulation part 95a in the inner hole of the lower ejection connection pipe 95. The thermal insulation part 95a suppresses the heat of the machining fluid flowing through the lower ejection connection pipe 95 from transferring to the lower arm 71. The lower ejection connection pipe 95 is included in the ejection connection pipe.

The lower arm 71 mainly transfers the surrounding heat by the thermal insulation part 95a. The surrounding temperature T0 of the lower arm 71 is the temperature T0 of the machining fluid in the machining tank 40. Since the machining fluid in the machining tank 40 is maintained at the predetermined temperature, the change in temperature is small as compared with the machining fluid flowing through the lower ejection connection pipe 95. The temperature T0 of the machining fluid in the machining tank is lower than the temperature T1 of the machining fluid flowing through the lower ejection connection pipe 95. At this time, the heat transferred from the surrounding machining fluid causes a smaller expansion/contraction amount of the lower arm 17 than the heat transferred from the machining fluid flowing through the lower ejection connection pipe 95.

The thermal conductivity kf of the thermal insulation part 95a may be 0.3 [unit: W/mK] or less. Preferably, the thermal conductivity kf of the thermal insulation part 95a may be 0.2 [unit: W/mK]. The thermal conductivity ks of the lower arm 71 may be 20 [unit: W/mK] or less. Preferably, the lower arm 71 may be ceramics.

The thermal insulation part 95a may be formed of a tube that has heat expandability. Preferably, the thermal insulation part 95a may be formed of a fluororesin tube that has heat expandability. The fluororesin tube is inserted into the inner hole of the lower ejection connection pipe 95, then heated to be expanded, and closely adheres to the inner peripheral surface of the lower ejection connection pipe 95, so as to be formed as the thermal insulation part 95a. The thermal insulation part 95a may be formed of a single tube that has heat expandability. The thermal insulation part 95a may also be formed by stacking at least two tubes having heat expandability to have a desired thickness. By forming the thermal insulation part 95a with use of a tube that has heat expandability, the manufacturing is easy and the manufacturing cost can be kept low. Nevertheless, the thermal insulation part 95a is not necessarily formed by the method of closely adhering the tube that has heat expandability. The thermal insulation part 95a may be formed by various methods if it can cover the inner peripheral surface of the lower ejection connection pipe 95.

A form of implementing the disclosure will be described in further detail below with illustration of an embodiment. The length L of the lower arm 71 in the longitudinal direction is 600 [unit: mm]. The cross-sectional shape perpendicular to the longitudinal direction of the lower arm 71 is a square with a side length W of 65 [unit: mm]. The inner diameter R of the lower ejection connection pipe 95 and the outer diameter R of the thermal insulation part 95a are set to 15 [unit: mm]. The thickness ts of the thinnest portion of the lower arm 71 is 25 [unit: mm]. The thermal insulation part 95a has a predetermined thickness tf [unit: mm].

The lower arm 71 is ceramics. The thermal conductivity ks of the lower arm 71 is 10 [unit: W/mK]. The linear expansion coefficient α of the lower arm 71 is 5/1000000 [unit: 1/K]. The reference temperature Tα of the linear expansion coefficient α of the lower arm 71 is 23 [unit: ° C.].

The thermal conductivity kf of the thermal insulation part 95a is 0.2 [unit: W/mK]. The thermal insulation part 95a is formed by heating and closely adhering the fluororesin tube to the inner peripheral surface of the lower ejection connection pipe 95.

The temperature T1 of the machining fluid flowing through the lower ejection connection pipe 95 is 25 [unit: ° C.]. The temperature T at the boundary between the thermal insulation part 95a and the lower arm 71 is 24 [unit: ° C.]. The temperature T0 of the machining fluid around the lower arm 71 is 23 [unit: ° C.].

The heat transfer amount Q [unit: W] is expressed by the following equation (1). The temperature TA [unit: K] is the temperature on the high temperature side. The temperature TB [unit: K] is the temperature on the low temperature side.

$$Q = G \cdot (TA - TB) \quad (1)$$

The thermal conductance G [unit: W/K] is expressed by the following equation (2). The cross-sectional area A is set to 1 [unit: square meter].

$$G = k \cdot A/t \quad (2)$$

The thermal conductance Gf [unit: W/K] of the thermal insulation part 95a is expressed by the following equation (3).

$$Gf = kf \cdot 1/(tf/1000) = 0.2/(tf/1000) \quad (3)$$

The thermal conductance Gs [unit: W/K] of the lower arm 71 is expressed by the following equation (4).

$$Gs = ks \cdot 1/(ts/1000) = 10/(25/1000) \quad (4)$$

The heat transfer amount Qf [unit: W] at the time when the machining fluid at the temperature T1 that flows through the lower ejection connection pipe 95 heats the boundary between the thermal insulation part 95a and the lower arm 71 to the temperature T through the thermal insulation part 95a having the thickness tf is expressed by the following equation (5).

$$Qf = Gf \cdot (T1 - T) = 0.2 \cdot ((25 + 273.15) - (T + 273.15))/(tf/1000) \quad (5)$$

The heat transfer amount Qs [unit: W] at the time when the machining fluid at the temperature T0 that exists around the lower arm 71 heats the boundary between the lower arm 71 and the thermal insulation part 95a to the temperature T through the lower arm 71 having the thickness ts is expressed by the following equation (6).

$$Qs = Gs \cdot (T - T0) = 10 \cdot ((T + 273.15) - (23 + 273.15))/(25/1000) \quad (6)$$

In the state where the heat transfer amount Qf on the side of the thermal insulation part 95a is equal to the heat transfer amount Qs on the side of the lower arm 71 (Qf=Qs), the temperature T [unit: ° C.] at the boundary between the thermal insulation part 95a and the lower arm 71 is expressed by the following equation (7).

$$T = (12.5 + 23tf)/(tf + 0.5) \quad (7)$$

If the thickness tf of the thermal insulation part 95a is 0.5 [unit: mm], the temperature T at the boundary between the thermal insulation part 95a and the lower arm 71 is 24 [unit: ° C.]. If the thickness tf of the thermal insulation part 95a is 1 [unit: mm], the temperature T at the boundary between the thermal insulation part 95a and the lower arm 71 is 23.7 [unit: ° C.]. If the thickness tf of the thermal insulation part 95a is 2 [unit: mm], the temperature T at the boundary between the thermal insulation part 95a and the lower arm 71 is 23.4 [unit: ° C.]. As the thickness tf of the thermal insulation part 95a covering the inner peripheral surface of the lower ejection connection pipe 95 increases, the heat of the machining fluid flowing through the lower ejection connection pipe 95 can be further insulated.

If the thickness tf of the thermal insulation part 95a is zero [unit: mm], the temperature T at the boundary between the thermal insulation part 95a and the lower arm 71 is 25 [unit: ° C.]. In the case where the thermal insulation part 95a is not provided, the heat of the machining fluid at the temperature T1 that flows through the lower ejection connection pipe 95 is directly transferred to the lower arm 71.

The expansion La [unit: μm] of the ceramics lower arm 71 with the thermal insulation part 95a of thickness tf [unit: mm] is expressed by the following equation (8).

$$La = \alpha \cdot (L/1000) \cdot ((T + 273.15) - (T\alpha + 273.15)) \quad (8)$$

If the thickness tf of the thermal insulation part 95a is 2 [unit: mm], the temperature T at the boundary between the thermal insulation part 95a and the lower arm 71 is 23.4 [unit: ° C.]. Therefore, the expansion La of the lower arm 71 is 1.2 [unit: μm]. If the thickness tf of the thermal insulation part 95a is 1 [unit: mm], the temperature T at the boundary between the thermal insulation part 95a and the lower arm 71 becomes 23.7 [unit: ° C.]. Therefore, the expansion La of the lower arm 71 is 2.1 [unit: μm]. If the thickness tf of the thermal insulation part 95a is 0.5 [unit: mm], the temperature T at the boundary between the thermal insulation part 95a and the lower arm 71 is 24 [unit: ° C.]. Therefore, the expansion La of the lower arm 71 is 3 [unit: μm].

In the case where the thermal insulation part 95a is not provided, that is, if the thickness tf of the thermal insulation part 95a is zero [unit: mm], the temperature T1 of the machining fluid flowing through the lower ejection connection pipe 95 corresponds to the temperature T at the boundary between the thermal insulation part 95a and the lower arm 71. Since the temperature T1 is 25 [unit: ° C.], the expansion La of the lower arm 71 is 6 [unit: µm].

As the thickness tf of the thermal insulation part 95a covering the inner peripheral surface of the lower ejection connection pipe 95 increases, the expansion La of the lower arm 71 can be suppressed.

The wire cut electric discharge machining apparatus of the disclosure has the thermal insulation part 95a on the inner peripheral surface of the lower ejection connection pipe 95 in the lower arm 71. The thermal insulation part 95a of the lower arm 71 insulates the heat of the machining fluid at the temperature T1 that flows through the lower ejection connection pipe 95 to suppress expansion/contraction of the lower arm 71. The length of the lower arm 71 basically expands/contracts according to the temperature T0 around the lower arm 71. The temperature T0 around the lower arm 71 is the temperature of the atmosphere or the temperature of the machining fluid in the machining tank 40 under temperature management. During electric discharge machining, the temperature T0 around the lower arm 71 is the temperature of the machining fluid in the machining tank 40, which is lower than the temperature T1 of the machining fluid flowing through the lower ejection connection pipe 95. Such a lower arm 71 has small fluctuation in expansion/contraction amount caused by heat. The length dimension of the lower arm 71 is always stable regardless of whether the machining fluid is ejected from the lower machining fluid ejection nozzle 81a, the difference in the flow rate of the machining fluid ejected from the lower machining fluid ejection nozzle 81a, the difference in the timing of ejecting the machining fluid from the lower machining fluid ejection nozzle 81a, whether there is machining fluid in the lower ejection connection pipe 95, etc. Therefore, the wire cut electric discharge machining apparatus of the disclosure can maintain high machining accuracy without changing the position of the lower guide part 81 supported by the lower arm 71. For example, even if electric discharge machining is started immediately after ejection of the machining fluid from the lower machining fluid ejection nozzle starts, the wire cut electric discharge machining apparatus of the disclosure can maintain high machining accuracy from the start to the end of the electric discharge machining.

In the case where an upper ejection connection pipe (not shown) penetrating the center of the upper arm 63 is provided to supply machining fluid to the upper machining fluid ejection nozzle 82a of the upper guide part 82, the inner peripheral surface of the upper ejection connection pipe may also be covered with a thermal insulation part like the lower ejection connection pipe 95. The temperature around the upper arm 63 is the temperature of the atmosphere. For example, as shown in FIG. 1, the upper arm 63 with the Z axis direction as the longitudinal direction expands/contracts in the Z axis direction due to the heat of the machining fluid flowing through the upper ejection connection pipe. The upper arm 63, which expands/contracts in the Z axis direction, changes the height of the upper guide part 82. The upper arm 63, which expands/contracts in the Z axis direction, has little influence on the change of the position of the upper guide part 82 in the X axis direction and the Y axis direction and has little influence on the machining accuracy in the X axis direction and the Y axis direction. The upper ejection connection pipe is included in the ejection connection pipe. The upper machining fluid ejection nozzle 82a is included in the machining fluid ejection nozzle.

Further, in the case where the wire electrode EL for machining the workpiece WP is positioned and guided by two horizontal guides (not shown) arranged opposite to each other on the left and the right, the disclosure may be applied to at least one of two horizontal arms (not shown) that respectively support the two horizontal guides. The horizontal guide is included in the guide part. A horizontal machining fluid ejection nozzle (not shown) in the horizontal guide is included in the machining fluid ejection nozzle. The horizontal arm is included in the arm. A horizontal ejection connection pipe (not shown) penetrating the center of the horizontal arm to supply machining fluid to the horizontal machining fluid ejection nozzle of the horizontal guide is included in the ejection connection pipe. The disclosure may be applied only to the arm in the direction that the expansion/contraction in the longitudinal direction has a large influence on the machining accuracy, or may be applied to all the anus.

The disclosure described above can be implemented in various forms without departing from the spirit and essential features of the disclosure. Accordingly, the embodiments described in this specification are illustrative and should not be construed as restrictive.

INDUSTRIAL APPLICABILITY

The disclosure can be used for wire cut electric discharge machining.

What is claimed is:
1. A wire cut electric discharge machining apparatus, comprising guide units having respectively a guide that guides a wire and arms that support the guide units,
   wherein at least one of the guide units comprises a machining fluid ejection nozzle that ejects a machining fluid, and
   at least one of the arms comprises an ejection connection pipe and a thermal insulation, wherein the ejection connection pipe is a hole penetrating the arm and is at least a part of a flow path that supplies the machining fluid to the machining fluid ejection nozzle, and the thermal insulation has a smaller thermal conductivity than the arm and covers an inner peripheral surface of the ejection connection pipe to thermally insulate an inner hole of the ejection connection pipe.

2. The wire cut electric discharge machining apparatus according to claim 1, wherein the at least one of the guide units is a lower guide unit having a lower guide as the guide that guides the wire under a workpiece,
   the at least one of the arms is a lower arm that supports the lower guide unit,
   the machining fluid ejection nozzle is a lower machining fluid ejection nozzle that ejects the machining fluid in the lower guide unit,
   the ejection connection pipe is a lower ejection connection pipe that is a hole penetrating the lower arm and is at least a part of a flow path that supplies the machining fluid to the lower machining fluid ejection nozzle, and
   the thermal insulation has a smaller thermal conductivity than the lower arm and covers an inner peripheral surface of the lower ejection connection pipe to thermally insulate an inner hole of the lower ejection connection pipe.

3. The wire cut electric discharge machining apparatus according to claim 1, wherein the at least one of the arms is formed of ceramics.

4. The wire cut electric discharge machining apparatus according to claim 2, wherein the at least one of the arms is formed of ceramics.

5. The wire cut electric discharge machining apparatus according to claim 1, wherein the thermal insulation is formed by heating and applying a tube that has heat expandability, and the machining fluid flows through the tube.

6. The wire cut electric discharge machining apparatus according to claim 5, wherein the tube is formed of fluororesin that has heat expandability.

* * * * *